United States Patent [19]

Bazzano

[11] Patent Number: 4,930,245

[45] Date of Patent: Jun. 5, 1990

[54] ARTIFICIAL SPOON-BAIT FOR FISHING

[75] Inventor: Guido Bazzano, Alessandria, Italy

[73] Assignee: Netts S.r.l., Casale, Monferrato, Italy

[21] Appl. No.: 412,915

[22] Filed: Sep. 26, 1989

[30] Foreign Application Priority Data

Oct. 13, 1988 [IT] Italy ................................. 8617 A/88

[51] Int. Cl.$^5$ ............................................. A01K 93/00
[52] U.S. Cl. .................. 43/42.17; 43/42.19;
  43/44.99; 43/42.06; 43/42.16
[58] Field of Search ................. 43/42.06, 42.16, 42.17,
  43/42.19, 44.99

[56] References Cited

U.S. PATENT DOCUMENTS

| | | | |
|---|---|---|---|
| 2,008,004 | 9/1934 | Catarau | 43/42.16 |
| 2,713,744 | 6/1954 | Strausser | 43/44.99 |
| 2,729,912 | 4/1954 | Moffett | 43/44.99 |
| 3,780,467 | 12/1973 | Lueck | 43/44.99 |
| 4,099,343 | 7/1978 | Enz | 43/42.19 |
| 4,208,824 | 6/1980 | Maxwell | 43/42.19 |
| 4,603,502 | 8/1986 | Mac Donald | 43/44.99 |

Primary Examiner—Kurt Rowan
Assistant Examiner—Michael William Starkweather
Attorney, Agent, or Firm—Fitch, Even, Tabin & Flannery

[57] ABSTRACT

An artificial spoon-bait or the like, characterized in that, in use, it can simultaneously act as ground-bait by means of at least one container situated near the spoon which forms part of the spoon-bait, the container being adapted to hold one or more substances which are intended to perform the attracting function of ground-bait, that is, to provide above all a smell, but possibly also a taste, attractive to fish, by means of the substances which are tasty and desirable to fish when the ground-bait substances are discharged in solution in the water during use of the artificial bait.

5 Claims, 1 Drawing Sheet

ARTIFICIAL SPOON-BAIT FOR FISHING

DESCRIPTION

The invention relates to artificial bait for fishing and particularly to the type usually known as spoon-bait.

Many types of spoon-bait are known for different species of fish but all make use of the fact that the fish is attracted by anything which moves, particularly if it acts unusually in the water. For this purpose, spoon-bait usually has a spoon which spins as the fisherman pulls in the line after casting it into the water, producing a multiplicity of reflections which excite and attract the fish.

The object of the invention is to enable bait of the aforesaid spoon type or the like also to act simultaneously as ground-bait, providing not only a visual attraction, as is the case with conventional spoon-bait known hitherto, but also a particular smell which is attractive to the fish, and possibly also an attractive taste, by means of substances which are tasty and desirable to the fish, that is, substances which are also attractive as food, all these attractions being achieved by the spoon-bait in use.

A further object is to provide a solution which is practical, functional and advantageous in both manufacture and use.

According to the invention, these objects are achieved by the provision of a lure of the aforesaid type which, in use, can also simultaneously act as ground-bait by means of at least one container situated near the spoon which forms part of the spoon-bait itself, the container being adapted to hold one or more substances which are intended to perform the attracting function of ground bait, that is, to provide above all a smell, but possibly also a taste, attractive to fish, by means of the substances which are tasty and desirable to the fish when the ground-bait substances are discharged in solution in the water during use of the artificial bait.

The container has one or more holes in at least one region of its walls for enabling the discharge and diffusion of the ground-bait substances from the container, particularly when they are in contact with water which enters the container.

The aperture of the holes can be preferably be varied in any suitable manner by any suitable means, so that the flow of water containing the ground-bait substances discharged from the container can be regulated according to different requirements of use.

These and other characteristics of the invention, and the advantages resulting therefrom, will become clearer in the course of the following detailed description of the embodiment which is preferred from amongst the various advantageous embodiments of the invention, this embodiment being illustrated purely by way of non-limiting example, with reference to the appended sheet of drawings, in which.

Figure 1:
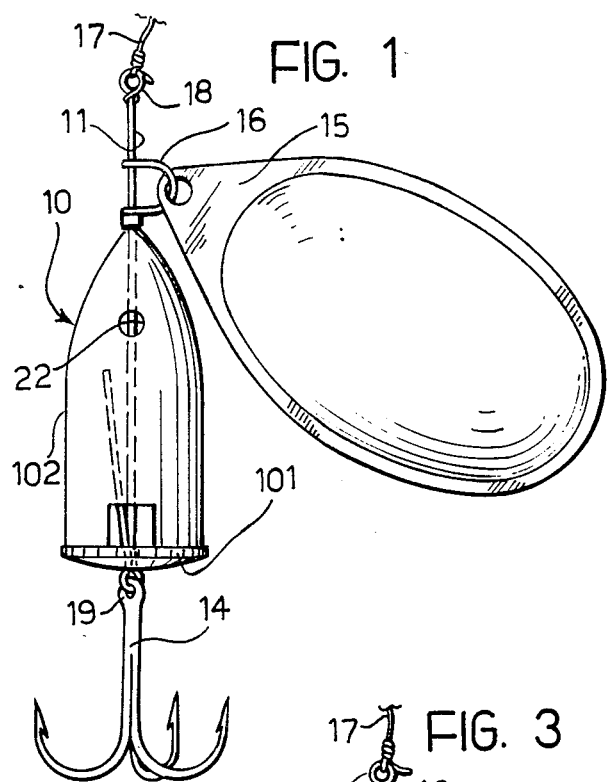
FIG. 1 shows an artificial, so-called spoon-bait according to the invention.

With reference to the drawings, the embodiment illustrated of the artificial so-called spoon-bait according to the invention includes a container 10 mounted on a shaft 11 which passes through it by means of suitable holes 12 and 13. According to a preferred embodiment, the container 10 is mounted on the shaft 11 between a hook 14 for catching the fish and a spoon 15, the latter being able to spin freely on the shaft 11 by means of a yoke 16 near the end of the shaft 11 to which the line 17 is connected by means of an eye 18.

In the embodiment illustrated, the container 10 includes two parts 101 and 102 which are coupled together for rotation relative to each other with slight interference. The part 101 acts as a closure plug, while the other part 102 is hollow so that it can act as a receptacle.

The part 102 of the container is coupled movably to the shaft 11 which passes through a hole 12, the other end of the shaft 11 passing through a hole 13 in the part 101 and then being bent back like a split pin so as to retain the part 101 axially in the right position relative to the part 102 and also to form an eye 19 which acts as a stop projection for the plug-like part 101 as well as an attachment for the hook 14.

The container 10 may be of any shape and configuration suitable for containing substances intended to perform the attracting function of ground-bait and allowing their diffusion to the exterior. In the embodiment shown, the container 10 has a substantially ogival shape.

The plug part 101 is constituted by a hollow cylindrical skirt 101a terminating externally in a knurled projecting rim 101b which affords a convenient grip for the user. The other part 102 is intended coaxially to engage the cylindrical skirt 101a of the part 101 by means of an end region 102a which faces the plug part 101 and is also cylindrical, the two regions 101a and 102a being coupled together coaxially with slight interference to form a movable coupling which, by virtue of the resilient deformability of the material of which they are made, enables the two parts 101 and 102, and hence the respective regions 101a and 102a, to rotate relative to each other, while remaining interconnected.

Respective holes 20 and 21, preferably of variable aperture, are formed in the two regions 101a and 102a for enabling the discharge and diffusion of the ground-bait substances from the container, particularly when they are in contact with the water which enters the container. Holes 22 for the admission of water to the container may also be provided.

An appropriate number of holes 20 and 21 of appropriate shape, size and arrangement is provided, the holes in one region being suitably spaced apart by a distance at least equal to the aperture of the holes in the other region so that the holes can be arranged in positions in which they are fully closed due to the complete superposition of each hole in the region of one part over the relative area between the hole or holes in the region of the other part, or in positions in which they are fully open as a result of the complete coincidence of at least two facing holes in the two regions, by the coaxial rotation of one part 101, 102 relative to the other part, and hence of the respective regions 101a, 102a, through a suitable angle. It is also possible for a hole in the region of one of the two parts to coincide partially with the facing hole in the region of the other part, thus enabling an intermediate adjustment of the holes so that the flow of the ground-bait substances in the water discharged from the container can be regulated according to the requirements of use.

In the embodiment illustrated, one or more holes 22 are also provided for enabling water to enter the container, the holes being formed adjacent the end of the container nearest to the point at which the line 17 is fixed.

It is intended that the holes, both for the discharge of the ground-bait substances in solution in the water and possibly for the admission of water, may be provided in any suitable number, shape, size and arrangement in the container.

Tests carried out by the Applicant have shown that, in practice, the spoon-bait according to the invention is effective with a single hole 20 associated with a single hole 21 of dimensions corresponding to the those shown in the drawings, without the need for holes 22.

Figure 2:
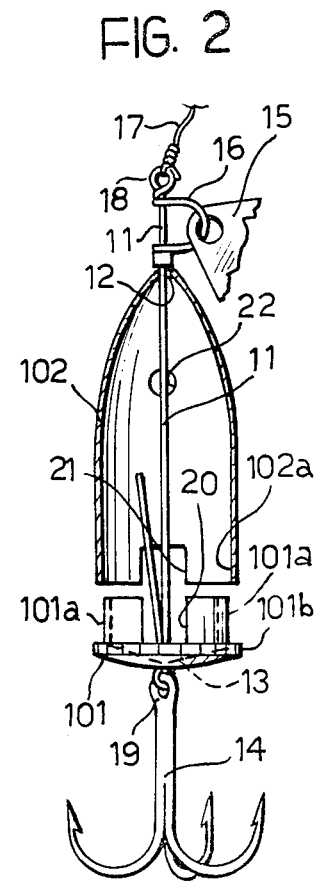
FIG. 2 shows the same spoon-bait with one part of the container in section and in a position in which it has been removed from the other part like a plug.
Figure 3:
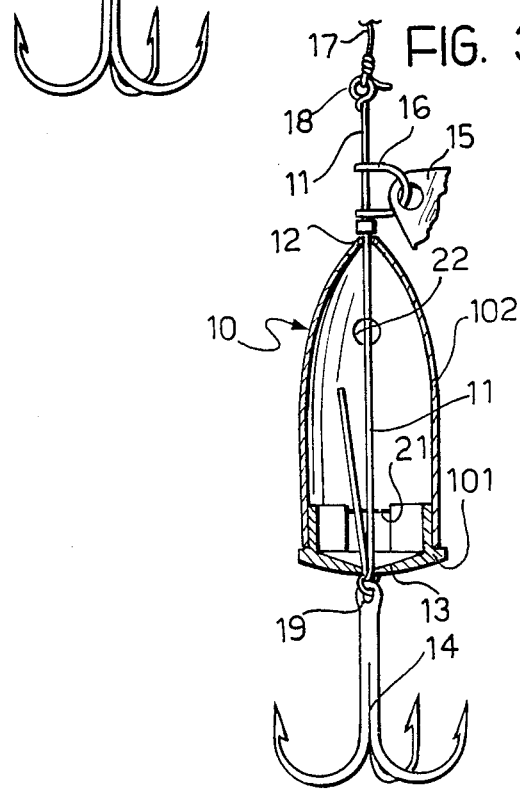
FIG. 3 is the same view of the spoon-bait as FIG. 1, with the container seen in section and with the plug-like part coupled to the other part of the container.
Figure 4:
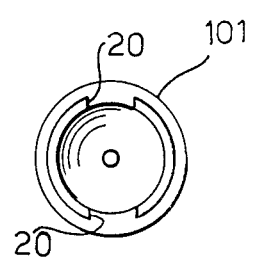
FIG. 4 is a view of the plug-like part from above.

When the part 102 coupled to the part 101 is removed from the latter (FIG. 2), it can, if necessary, move axially by a suitable distance along the shaft 11 which passes axially through the container 10, so that it can be moved a corresponding distance away from the part 101 until it meets the yoke 16 which in turn is retained by the eye 18. It is thus possible easily to insert the ground-bait substances into the part 102 of the container 10. Clearly, the parts 101 and 102 must then be fixed together again by the coaxial coupling of the two regions 101a and 102a (FIGS. 1 and 3) when the ground-bait substances have been inserted in the container.

The ground-bait substance or substances may consist of any substances suitable for performing the attracting function of ground-bait, that is, for providing above all a smell which is attractive to fish, the substances being of any structure and state, for example, solid, liquid, granular, powdered, etc., the substances also possibly being tasty and desirable to fish and thus also possibly being attractive as food.

According to another advantageous characteristic of the invention, when the holes 20, 21 of the container 10 are arranged in positions such that it is completely closed, the attracting function of the ground-bait is inhibited and the artificial lure according to the invention can still be used conventional spoon-bait.

Preferably, it is intended that the container 10 be made so that it can be disassembled into two or more parts which can be taken apart and fitted together in any suitable manner and by any suitable means, but, according to variants not shown, the container 10 may be formed by parts which cannot be disassembled and taken apart, in which case the ground-bait substance or substances are inserted into the container directly through the hole or holes therein.

Preferably, therefore, the aperture of the holes in the container, particularly the discharge holes, may also be varied in any suitable manner other than that shown and by any suitable means.

It is obvious from the above description that the invention is not limited to the embodiment just described and illustrated purely by way of non-limiting example, but may be varied and modified, particularly structurally, as a whole or in its individual details, according to the particular requirements and conditions of manufacture and use and within the ambit of technical and functional equivalents, without thereby departing from the concept described above and claimed below.

I claim:

1. Artificial spoon-bait for fishing, which is adapted to be connected to a line and comprises a connecting element for connection to the line, at least one hook connected to the connecting element, at least one spinning spoon carried by the connecting element, a container carried by the connecting element near the spinning spoon, insertion means for enabling substances intended to perform an attracting function of ground-bait to be inserted in the container, and discharge means for dispensing the substances from the container in an adjustable manner the container comprising two parts which are coupled together axially for rotation relative to each other and have respective holes which can be arranged in relative angular positions of variable aperture between an end position in which they are completely closed and an end position in which they are completely open, by the relative rotation of the two parts.

2. Artificial bait according to claim 1, in which the connecting element is a shaft which passes axially through the container and forms a first end eye which carries said at least one hook and a second eye for the connection of the line, the spinning spoon being mounted on the shaft between the container and the second eye.

3. Artificial bait according to claim 2, in which the two parts of the container comprise a generally ogival front part and a rear part which forms a plug and has a circumferential handling surface projecting axially from the front part, and in which at least one of the front part and the rear part is rotatable relative to the shaft.

4. Artificial bait according to claim 3, in which the front and rear parts are separable axially by the sliding of one along the shaft relative to the other.

5. Artificial bait according to claim 1, in which the container also has at least one inlet hole for the passage of water towards the discharge holes in use.

* * * * *

UNITED STATES PATENT AND TRADEMARK OFFICE
CERTIFICATE OF CORRECTION

PATENT NO.   :   4,930,245
DATED        :   June 5, 1990
INVENTOR(S)  :   Guido Bazzano It is certified that error appears in the above-identified patent and that said Letters Patent is hereby corrected as shown below:

Column 1, line 44, delete "be", first occurrence.

Column 3, line 14, delete "the".

Column 3, line 23, change "possible easily" to --easily possible--.

Column 3, line 42, after "used" insert --as--.

Signed and Sealed this

Sixteenth Day of June, 1992

Attest:

DOUGLAS B. COMER

Attesting Officer

Acting Commissioner of Patents and Trademarks